(12) United States Patent
Kaszubowski et al.

(10) Patent No.: US 6,547,476 B2
(45) Date of Patent: *Apr. 15, 2003

(54) UNIVERSAL SPACECRAFT SEPARATION NODE

(75) Inventors: Mark Kaszubowski, Littleton, CO (US); Christopher Kerley, Littleton, CO (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,721

(22) Filed: Aug. 17, 1999

(65) Prior Publication Data

US 2002/0164204 A1 Nov. 7, 2002

(51) Int. Cl.[7] .................................................. B64G 1/64
(52) U.S. Cl. ..................... 403/322.3; 403/321; 244/161
(58) Field of Search ............................... 403/322.1, 321, 403/322.3, 322.4, 325; 244/161

(56) References Cited

U.S. PATENT DOCUMENTS

| | | | |
|---|---|---|---|
| 4,682,745 A | * 7/1987 | Acres | 244/161 |
| 4,776,539 A | 10/1988 | Byers et al. | 244/158 |
| 5,040,748 A | 8/1991 | Torre et al. | 244/158 |
| 5,040,749 A | * 8/1991 | Johnson | 244/161 |
| 5,104,070 A | * 4/1992 | Johnson et al. | 244/161 |
| 5,603,595 A | 2/1997 | Nygren, Jr. | 411/366 |
| 5,743,492 A | 4/1998 | Chan et al. | 244/118.2 |
| 5,860,624 A | * 1/1999 | Obry et al. | 244/161 X |

* cited by examiner

Primary Examiner—Lynne H. Browne
Assistant Examiner—John R. Cottingham
(74) Attorney, Agent, or Firm—Marsh Fischmann & Breyfogle LLP

(57) ABSTRACT

An integrated separation system and interface structure is disclosed for a variety of deployment applications. In one embodiment, a Universal Spacecraft Separation Node (100) includes a separation nut assembly (102), a separation spring assembly (104) an LV node fitting (106) and an SC node fitting (108). The LV node fitting (106) is connected to a launch vehicle (210) and the SC node fitting (108) is connected to a spacecraft (216). The separation nut assembly (102) holds the fittings (106 and 108) together until separation is desired. Upon separation, the separation spring assembly (104) provides a force to urge the launch vehicle (210) and spacecraft (216) apart. Prior to separation, an annular tongue (224) of fitting (108) mates with an annular groove (226) of fitting (106) to resist shear forces.

22 Claims, 11 Drawing Sheets

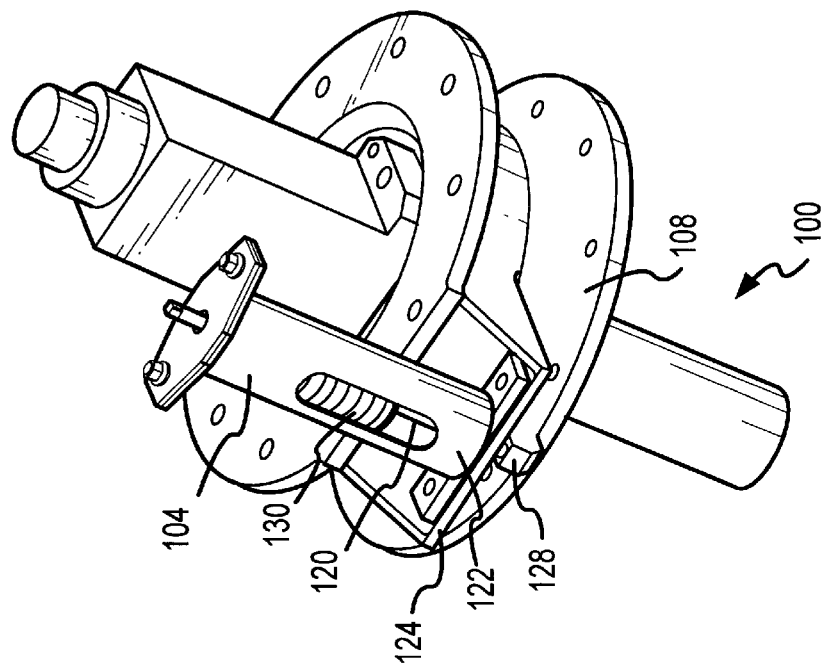
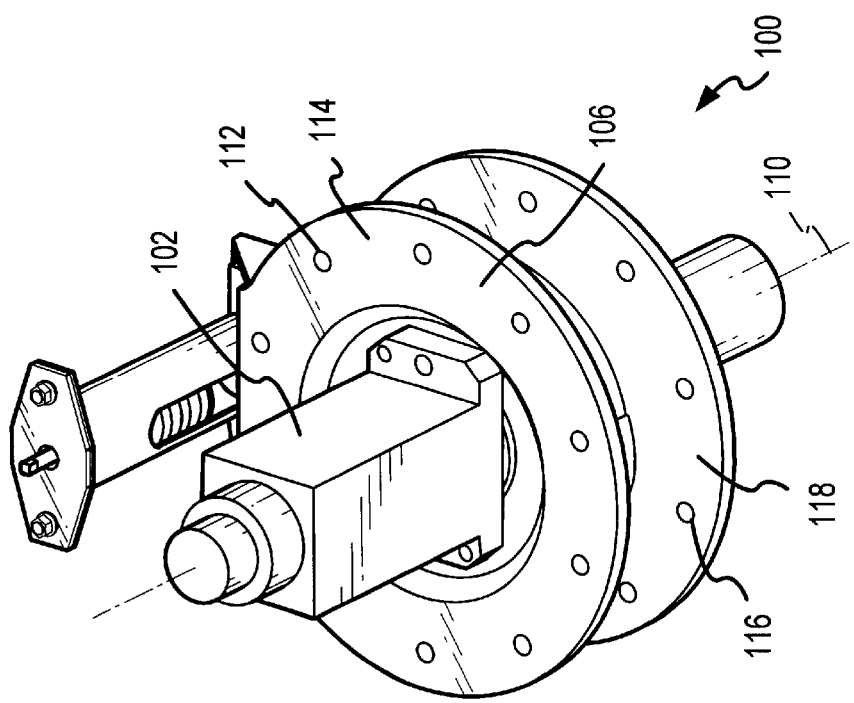
FIG.1A
FIG.1B

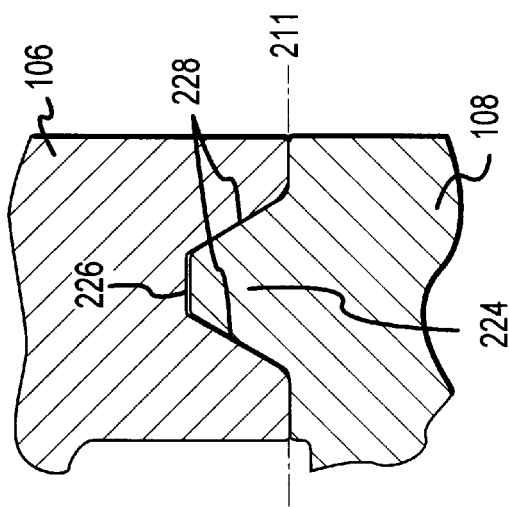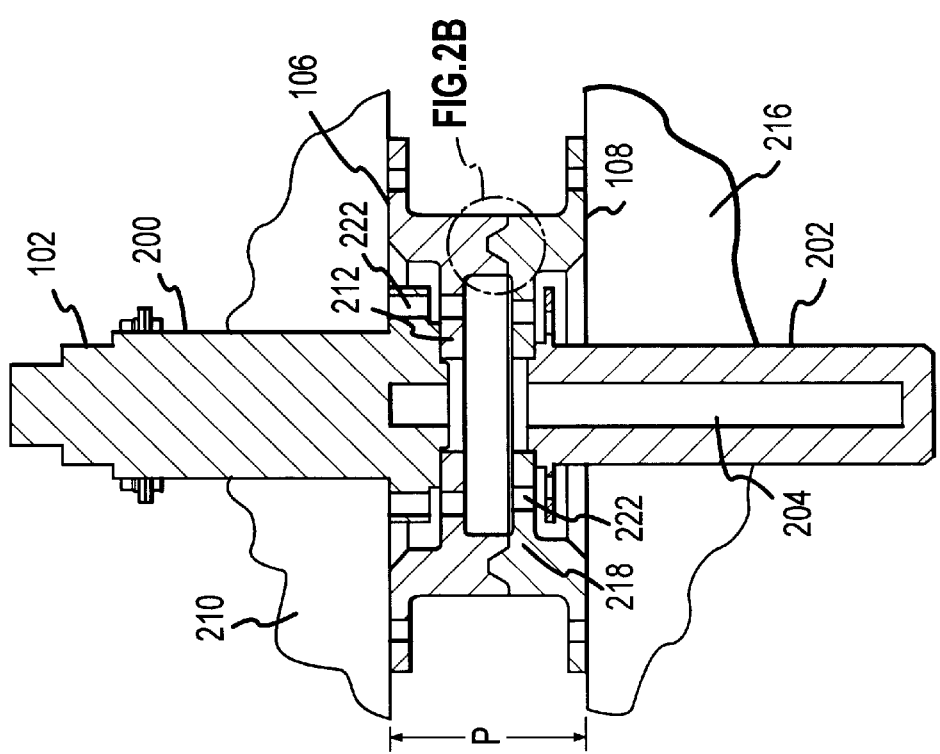

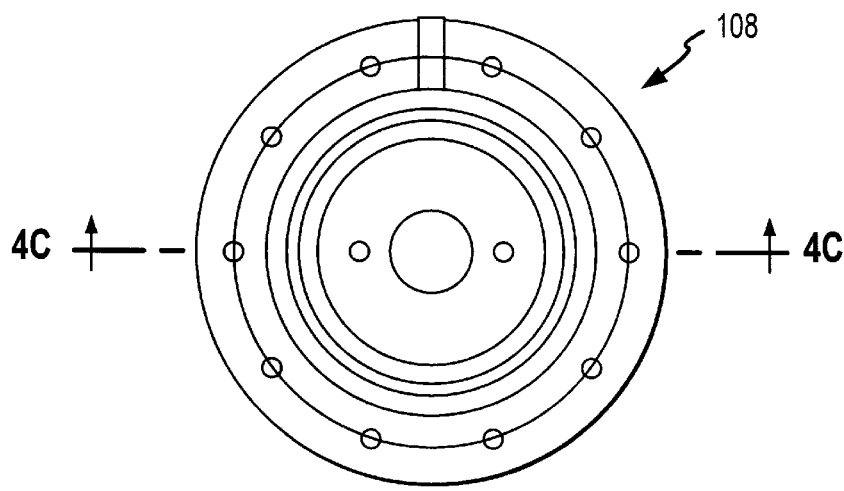
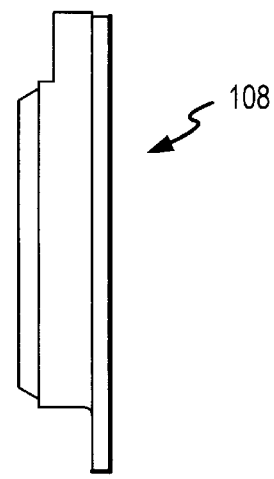
FIG.4A
FIG.4B
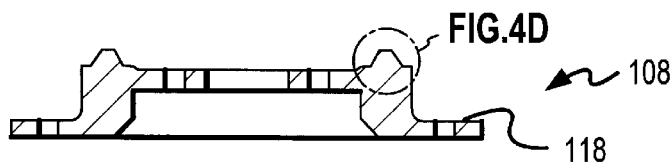
FIG.4C
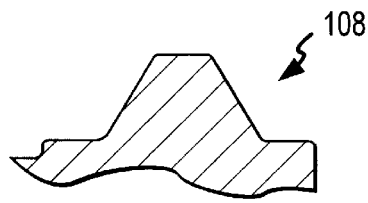
FIG.4D

UNIVERSAL SPACECRAFT SEPARATION NODE

FIELD OF THE INVENTION

The present invention relates generally to space vehicle separation systems and, in particular, to a separation system employing an interface 'node' between a deployable space vehicle and a space launch vehicle. The invention provides a standardized interface for space vehicles thereby reducing, or substantially eliminating, interface integration efforts between the space vehicle and launch vehicle builders. The invention also provides improved structural response characteristics under applied loading when compared to other interface designs.

BACKGROUND OF THE INVENTION

Separation systems are used in a variety of contexts to provide controlled deployment of a deployable unit from a support structure. For example, in aerospace applications, separation systems are used in the space launch business to attach a space vehicle (i.e. spacecraft or satellite) to, and deploy from, a launch vehicle. They may also be used to deploy solar panels, scientific equipment, or other units from a stowed position on the space vehicle. Other possible applications of separation systems include, for example, aircraft ejection seat release, parachute actuation, and other applications involving controlled separation of two surfaces or structures. It will thus be appreciated that separation and associated deployment may involve complete detachment of the deployable unit from the support structure or movement from a non-deployed position to a deployed position. Although the present invention has been developed primarily for use in attaching a space vehicle to a space launch vehicle, it is apparent that further applications and adaptations of the invention are possible.

Generally, the interface between the space vehicle and the launch vehicle is defined by abutting interface surfaces between the two. The separation system typically includes one or more release assemblies that hold the spacecraft and launch vehicle together until the desired time of release. At the desired time of release, the separation system detaches, or disengages, releasing the space vehicle from the launch vehicle. Common separation systems include pyrotechnically actuated clamp-bands, separation nuts, and separation bolts. The present invention is intended for use where an interface incorporates a separation nut or bolt. These types of interfaces can incorporate any number of release mechanisms, typically the same type and size. This type of interface is sometimes referred to as a 'hard-point' or 'node' interface.

The interface between a space vehicle and a launch vehicle must be capable of transferring loads between the two structures. These loads can include vibration, acceleration, thermal, and static loads. For this reason, features of the interface must be tightly controlled with respect to tolerances associated with machining or forming processes. The longitudinal loads acting along the primary axis of the launch vehicle (i.e. the axis parallel to the primary vector of travel) are reacted by the separation bolt and bearing surfaces between the two structures. The shear loads, or side loads (those normal to the longitudinal loads), are reacted by shear pins or lips.

Because the interface features of a space vehicle and launch vehicle are generally controlled by separate manufacturers or groups within an organization, extensive integration efforts are required to ensure compatibility between the two pieces of hardware. In addition, typically a space vehicle will not be fit checked with a launch vehicle until both are nearly fully assembled. Moreover, it may be required that a space vehicle be compatible with several launch vehicles from the same manufacturer or different manufacturers. As a result, existing separation systems and associated interface configurations entail significant risk associated with new unit development, complicated integration efforts, and limited system interchangability. Furthermore, historically, each unique space vehicle has incorporated a unique, and often dramatically different, node design for the launch vehicle interface. The present invention is an attempt to provide a standardized node design.

SUMMARY OF THE INVENTION

The present invention is directed to a novel interface structure for interfacing a space vehicle or other deployable unit and a launch vehicle or other support structure, and to an associated separation system. The invention allows for interfacing the space vehicle and launch vehicle via an intermediate node that preferably incorporates both the separation system and structural interface functions. In this manner, the space vehicle and launch vehicle can be interfaced without extensive integration of the associated designs. Such an interface structure lends itself to standardization so as to mitigate risk associated with new support structure and/or deployable unit development, streamlines integration efforts, and provides a unique capability with widespread application.

The present invention incorporates the complex interface features within the system itself while providing an easily controlled interface to both the space vehicle and launch vehicle. The tightly controlled load carrying features are internal to the 'node' while simple bolt hole patterns, controlled by common tooling, provide easy to produce interfaces to the two vehicles. The load carrying features can be verified at the node component level while bolt hole patterns are verified through 'matched' tooling. This virtually eliminates any concerns of mismatch between the two vehicles.

According to one aspect of the present invention, an interface apparatus is provided for selectively connecting a deployable unit such as a space vehicle and a support structure such as a launch vehicle. The deployable unit includes a first interface surface and the support structure includes a second interface surface wherein, prior to deployment, the first and second interface surfaces are disposed in opposing relationship to define an interface. As set forth below, the interface surfaces need not be abutting. The deployable unit is deployable from an undeployed state where the first and second interface surfaces are proximate to one another in a deployed state wherein the interface surfaces are separated. The interface apparatus includes a support structure node member, interconnected to the support structure including a first contact surface and a deployable unit node member, interconnected to the deployable unit including a second contact surface. The first and second contact surfaces are disposed in an abutting relationship when the deployable unit is in the undeployed state so as to define a separation plane. The separation plane is located at the interface and separated from at least one of the first and second interface surfaces such that the support structure node member and deployable unit node member provide an interface structure, thereby reducing first and second interface surface design integration.

Preferably, the support structure node member and the deployable unit node member are configured so that the interface surfaces of the support structure and deployable unit are separated. In this manner, the need to integrate the support structure and deployable unit designs can be reduced or substantially eliminated. Such separation can be achieved with a variety of node configurations. For example, each of the node members can extend from its respective interface surface such that the contact surfaces are disposed between the interface surfaces prior to deployment, one of the node members can extend from its interface surface such that the contact surfaces are substantially flush with the other interface surface prior to deployment, or one of the node members can extend from one interface surface and the other node member can be recessed relative to the other interface surface such that the contact surfaces are outside of the area between the interface surfaces prior to deployment. In the last of these cases, it will be appreciated that the depth of the recessed node member will generally be less than the height of the extended node member so that the interface surfaces may remain separated.

According to another aspect of the present invention, an interface apparatus is provided that includes structure for bearing lateral loads. In a variety of deployable unit applications including, for example, dispensing payload spacecraft into orbit from a launch vehicle, substantial lateral loads may be experienced at the separation plane. Such loads may result, for example, from vibrations as the launch vehicle is launched and travels through the Earth's atmosphere. Such loads can generate substantial shear at the separation plane, potentially resulting in unintended separation if not adequately supported. In accordance with the present invention, a separation apparatus includes a support structure node member and a deployable unit node member including contact surfaces defining a separation plane. The apparatus further includes a lateral load bearing element associated with the contact surfaces at the separation plane for bearing loads having a component aligned with the separation plane so as to reduce the likelihood of unintended shearing separation prior to planned deployment. The lateral load bearing element preferably includes structure extending across the separation plane at the contact surfaces. Such structure may be provided by forming the contact surfaces of the node members in a non-planar configuration or by otherwise providing structure extending across the separation plane at the interface between the contact surfaces. In one embodiment, one of the contact surfaces includes a tongue and the other contact surface includes a mating groove such that the resulting tongue-in-groove structure provides resistance to shear forces.

According to a further aspect of the invention, an apparatus is provided for integrating the separation assembly and interface structure in connection with a deployment system. The apparatus includes a support structure node member, a deployable unit node member and a separation bolt assembly. The bolt assembly has a first portion connected to the support structure node member and a second portion connected to the deployable unit node member. The bolt assembly is separable between the first and second portions to effect deployment. Preferably, the bolt assembly includes an elongate element extending from one of the node members to the other across the separation plane there between. In one embodiment, the node members define an internal passageway extending between the node members and the separation bolt assembly extends within the passageway. By virtue of such structure, the separation and interface functionality is integrated into a single unit that can be standardized for use in connection with different types of support structure/ deployable unit interfaces.

According to a still further aspect of the present invention, a biasing assembly is provided in combination with interface node members to facilitate deployable unit separation. The associated apparatus comprises a support structure node member and a deployable unit node member including contact surfaces defining a separation plane. The apparatus further includes a biasing assembly connected to at least one of the deployable unit and support structure, for urging the contact surfaces apart so as to facilitate deployment of the deployable unit. The biasing assembly, which may include a spring or any other mechanism suitable for exerting a separation force, may act on one or both of the node members or directly on the support structure and/or deployable unit. In a preferred embodiment, the biasing assembly is interconnected to one of the nodes and bears against the other of the nodes in order to provide the desired biasing.

BRIEF DESCRIPTION OF THE DRAWINGS

For a more complete understanding of the present invention, and further advantages thereof, reference is now made to the following detailed description taken in conjunction with the drawings, in which:

FIGS. 1A–1B are perspective views of a Universal Spacecraft Separation Node (USSN) assembly in accordance with the present invention;

FIGS. 2A–2B are cross sections of the USSN assembly of FIGS. 1A–1B and shear feature detail;

FIGS. 4A–4D are top, partial side, cross-sectional and shear feature detail views, respectively, of a USSN space vehicle (SV) node fitting in accordance with the present invention;

DETAILED DESCRIPTION

Figure 3A:
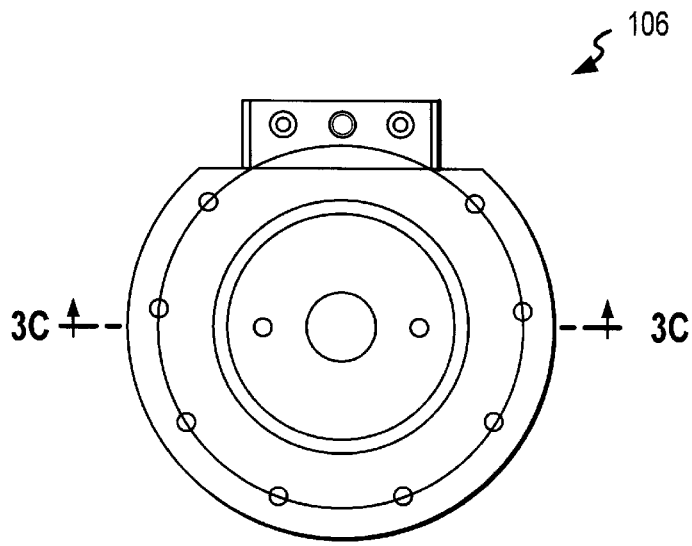
FIGS. 3A–3D are top, partial side, cross-sectional and shear feature detail views, respectively, of a USSN launch vehicle (LV) node fitting in accordance with the present invention.
Figure 3B:
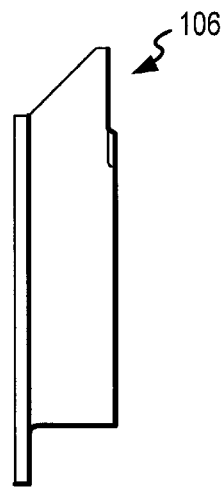
Figure 3C:
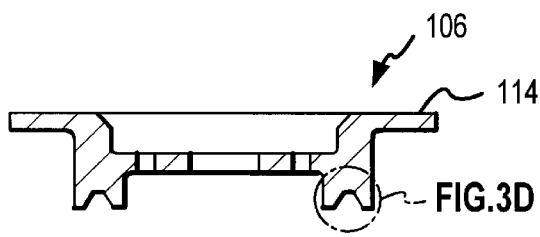
Figure 3D:
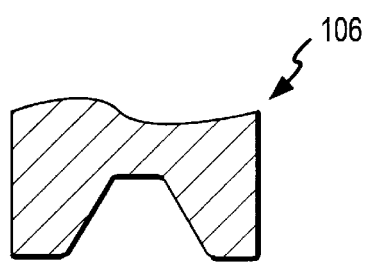

In the following description, the invention is set forth in the context of various separation system embodiments adapted for selectively separating a space vehicle (i.e. spacecraft) from a space launch vehicle. It will be appreciated, however, that the invention is applicable in a variety of contexts where it is desired to maintain a deployable unit in an non-deployed state until a desired time and then allow for separation of the deployable unit from a support structure. Accordingly, it will be understood that the following embodiments are provided for purposes of illustration and the invention is not limited to any such specific embodiments.

Referring to FIGS. 1A–1B, two views of a Universal Spacecraft Separation Node (USSN) assembly 100 in accordance with the present invention are shown. The USSN 100 includes a separation nut assembly 102, a separation spring assembly 104, a launch vehicle node fitting 106, and a spacecraft node fitting 108. As will be described below, the USSN 100 is used to hold a spacecraft on a space launch vehicle support structure until separation is desired, e.g., to insert the spacecraft into a desired orbit. Multiple USSNs 100 may be used to secure and release a spacecraft and multiple spacecraft may be carried by a single launch vehicle. It will thus be appreciated that numerous USSNs 100 may be used in connection with a single launch vehicle in multiple cooperating groups. It will be appreciated that the USSN may be used in a variety of configurations. In the illustrated embodiment, the node fittings are generally cylindrical, defining an internal passageway for accommodating the separation nut assembly 102.

The separation nut assembly 102 is operative for holding the LV node fitting 106 and the SC node fitting 108 together until release of the spacecraft is desired, and then to allow the fittings 106 and 108 to separate relative to the axis 110 of the assembly 102. The LV node fitting 106 is connected to the launch vehicle structure via aerospace quality fasteners extending through bolt holes 112 in the mounting flange 114. The SC node fitting 108 is connected to the spacecraft via similar fasteners extending through the bolt holes 116 in the mounting flange 118 into the spacecraft structure. Note that the mounting flanges 114 and 118 can be modified to accommodate a variety of mounting configurations without impacting the functionality of the USSN assembly 100. Accordingly, operation of the separation nut assembly 102 to allow separation of the fittings 106 and 108 is effective to permit release of the spacecraft from the launch vehicle.

The separation spring assembly 104 provides the force for initial separation of the spacecraft from the launch vehicle once the separation nut 102 has released. This force can be applied directly to a feature on the spacecraft or, more preferably, it can be integrated into the USSN 100. By integrating the spring interface features into the USSN 100, integration efforts between the spacecraft and launch vehicle are reduced. In addition, structural enhancements to the spacecraft to accommodate the spring are eliminated. The USSN assembly 100 mounts the spring assembly 104 to the LV node fitting 106 to minimize separated spacecraft weight. However, if required, the spring could be mounted to the SV node fitting 108. The spring assembly 104 includes a piston 120 contained within a cylindrical housing 122. The housing 122 is mated to a mounting feature 124 which is an integral feature of the LV node fitting 106. The piston rod 120 extends through the end of the housing 122 and abuts against a feature 128 on the SV node fitting 108. A spring 130 provides the force to push the piston rod 120. The characteristics (e.g. the spring constant) of the spring 130 can be selected in relation to the spacecraft mass and the total number of USSNs 100 acting on the spacecraft to impart the desired separation force. This force can be varied to obtain a desired separation velocity of the spacecraft.

FIGS. 2A and 2B show details of the USSN assembly 100 and the interface features between the LV node fitting 106 and SV node fitting 108. As mentioned, the USSN 100 is capable of accommodating different separation nut assemblies 102. The illustrated embodiments show the baseline configuration of the USSN 100 which incorporates a Fast Acting Shockless Separation Nut (FASSN) marketed by Starsys Research Corporation of Boulder, Colo. (see www.starsys.com). The FASSN is described in U.S. Pat. No. 5,603,595 entitled "Flywheel Nut Separable Connector and Method". The illustrated separation nut assembly 102, which includes the LV mounted actuator 200 and SV mounted bolt extractor 202, are interconnected prior to release via a threaded rod 204. The actuator 200 mounts to an internal web feature 212, which is integral to the LV node fitting 106, using common aerospace quality fasteners. Fastener holes 222 can vary dependent on what separation nut assembly 102 is used. The bolt extractor 202 mounts to an internal web feature 218, which is integral to the SV node fitting 108, using common aerospace quality fasteners. Fastener holes 222 can vary dependent on what separation nut assembly 102 is used. The actuator 200 and the bolt extractor 202 remain attached to the node fittings 106 and 108 at disengagement of the node fittings 106 and 108 at the separation plane 211.

The separation plane 211, i.e. the plane where the launch vehicle 210 (including the node fitting 106) and the spacecraft 216 (including the node fitting 108) are in contact until separation, can be positioned at various locations depending on requirements or constraints relative to a specific spacecraft. In FIG. 2A, the dimension P can be increased to effectively enclose either the actuator 200 of the separation nut assembly 102, the bolt extractor 202, or both such that they are internal to the USSN assembly 100. This configuration could be used if the LV structure 210 or SV structure 216 is not tolerant of intrusions. The reconfiguring of the USSN 100 as stated above does not affect the functionality of the assembly.

Because the USSN 100 defines the structural interface between the launch vehicle 210 and spacecraft 216, it incorporates features for bearing loads between the two. These loads include lateral loads, i.e. loads having a component in the separation plane 211, as well as longitudinal loads, i.e. loads normal to the separation plane 211 along the axis 110. Compressive longitudinal loads are reacted by the interfacing features of the node fittings 106 and 108 at the separation plane 211. Tensile longitudinal loads are reacted by the separation nut assembly 102. The lateral, or shear, loads are reacted by an circular tongue and groove feature as illustrated in FIG. 2B. The baseline USSN 100 configuration incorporates the tongue feature 224 into the SV node fitting 108 and the groove feature 226 into the LV node fitting 106. However, these could be reversed without affecting the functionality of the USSN assembly 100. The side walls 228 of the tongue and groove are where the node fittings 106 and 108 bear against each other to resist the shear loading. The side walls 228 are angled relative to the separation plane 211. The angle is critical to allow proper separation while preventing the shear loads from being converted into longitudinal loads which could cause gapping of the interface. In other words, the angle is steep enough such that the lateral loads are not translated into separation loads (ideal angle for load reaction is 90 degrees from the separation plane, i.e. a square tongue and groove). However, as the angle approaches 90 degrees, friction between the surfaces will affect separation between the spacecraft and launch vehicle. A side wall angle of 60 degrees from the separation plane was chosen.

FIGS. 3A–4D illustrate the USSN launch vehicle and space vehicle node fittings. These fittings are preferably made from common aluminum alloy material. For convenient cross-reference, certain reference numerals from FIGS. 1A–1B are shown.

Figure 5A:
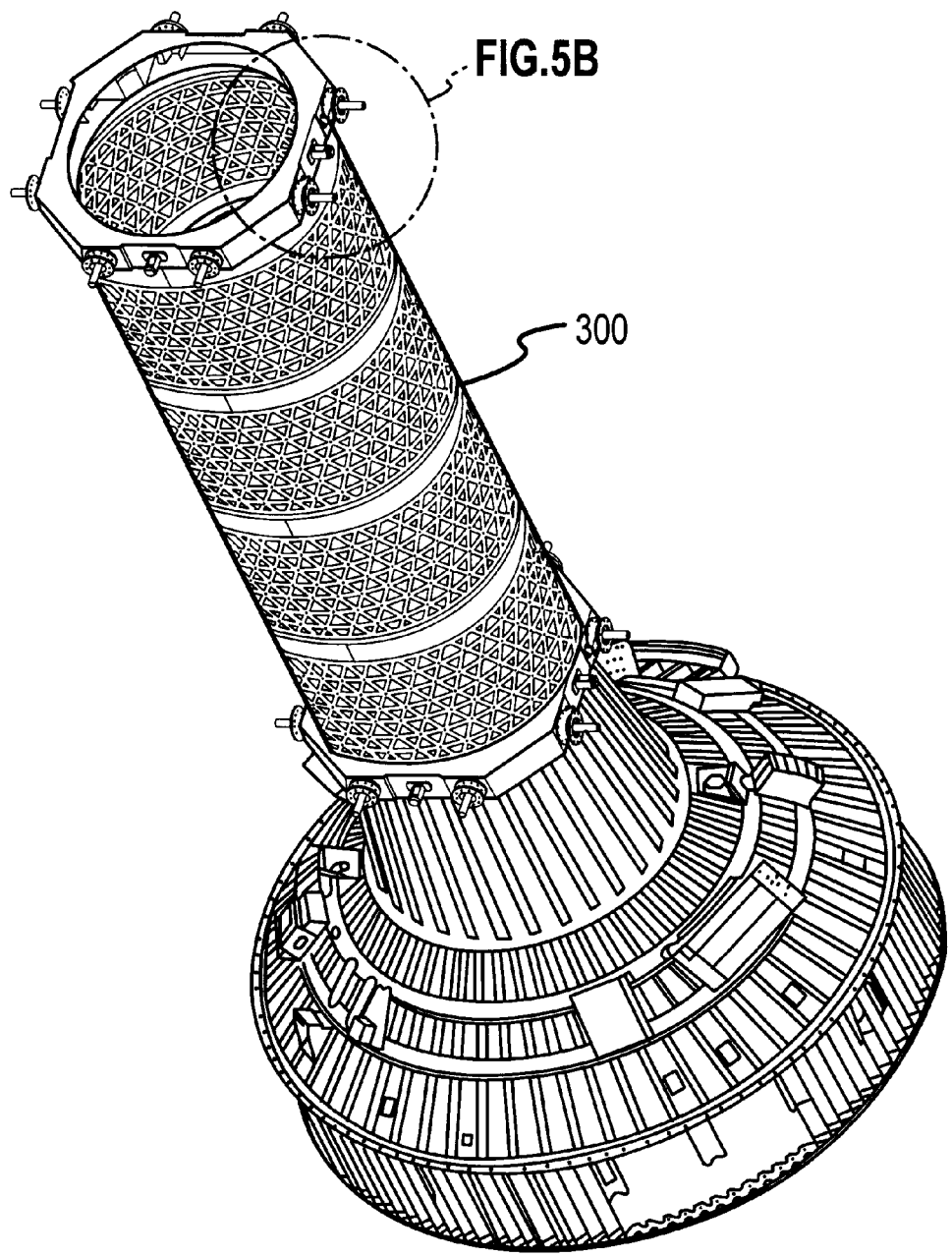
FIGS. 5A–5B show the USSN of FIGS. 1A–1B incorporated on a spacecraft support structure (dispenser) in accordance with the present invention.
Figure 5B:
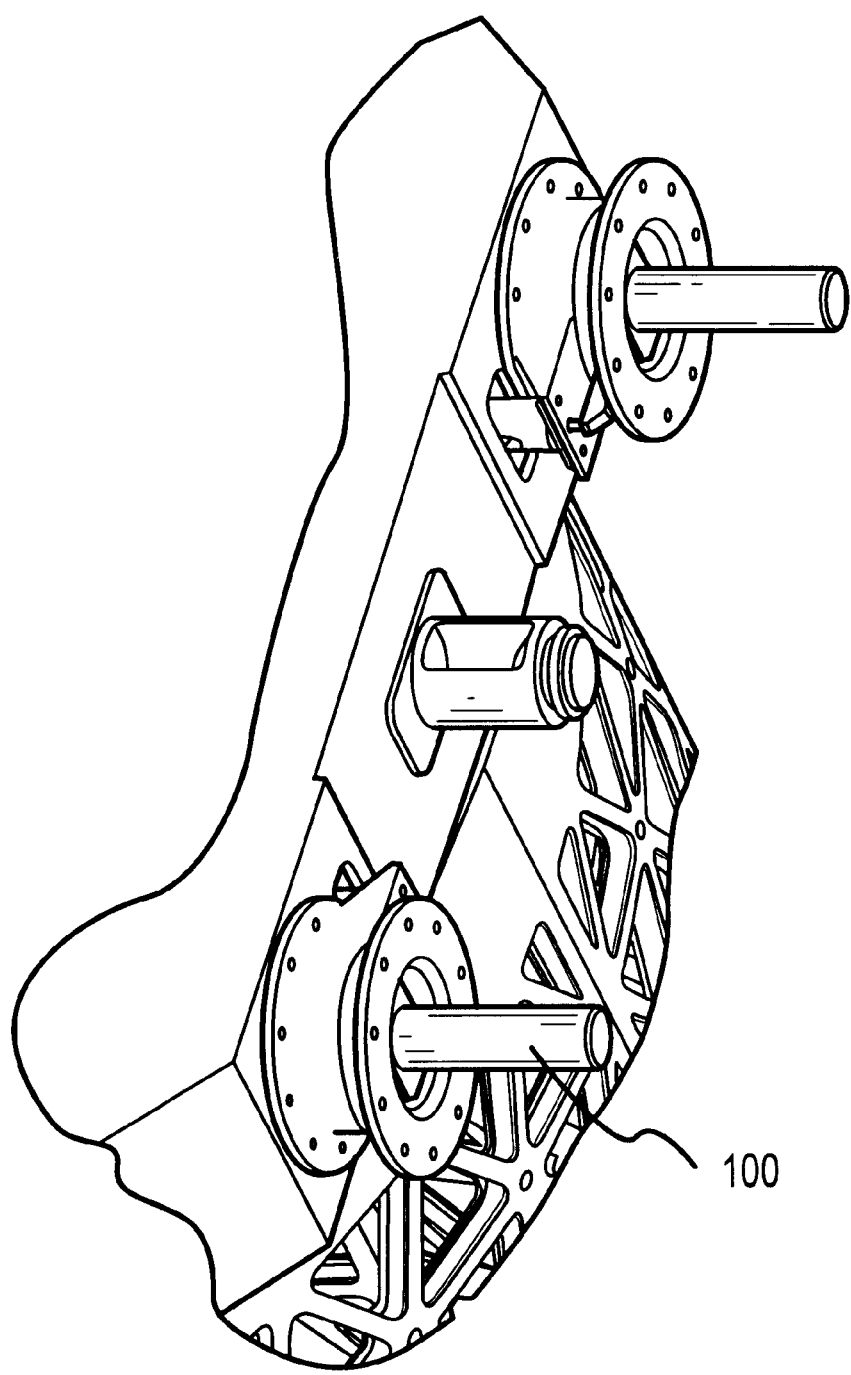

FIGS. 5A and 5B illustrate a multiple spacecraft support structure (dispenser) 300. In this configuration, four USSN assemblies 100 are used to mount a spacecraft to the support structure. This support structure is designed to accommodate four spacecraft. Thus, a total of 16 USSN assemblies 100 are used.

Figure 6A:
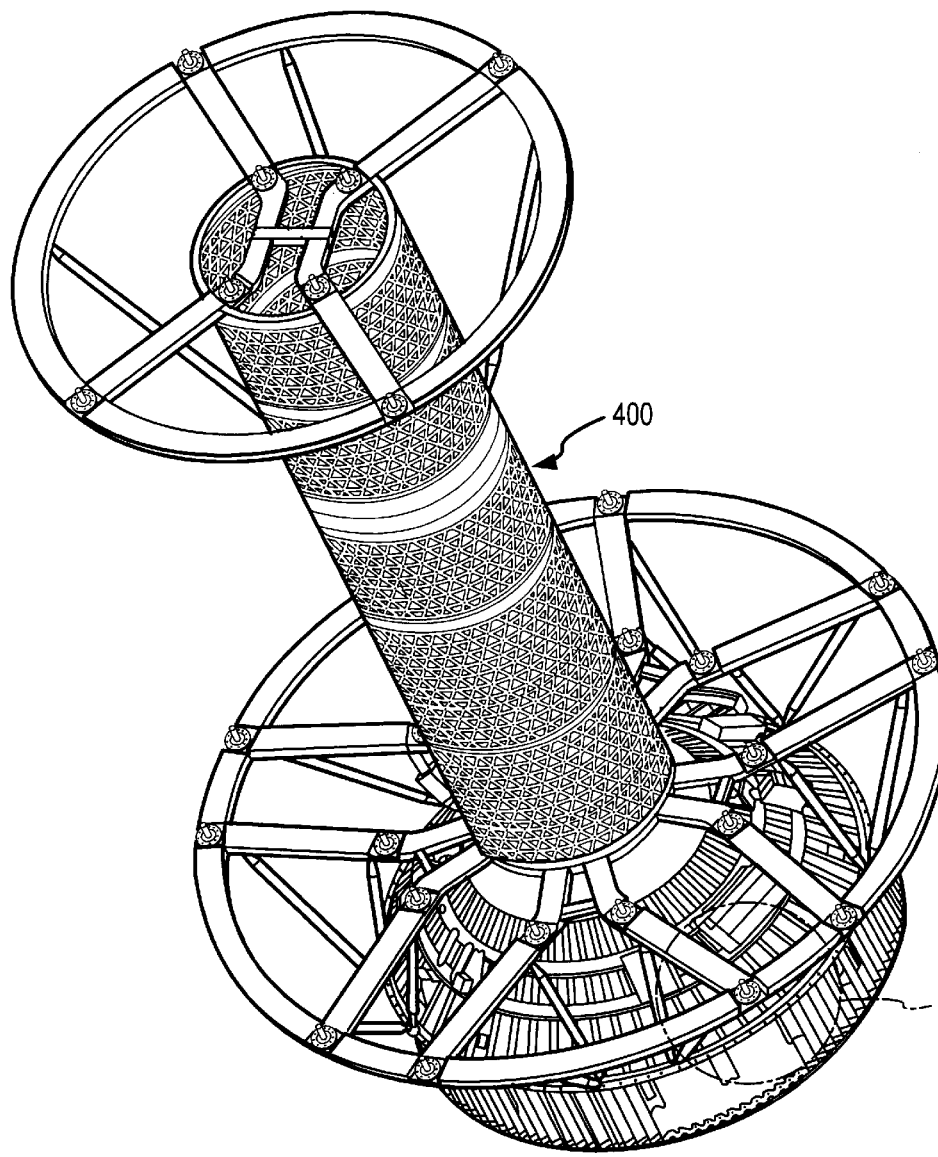
FIGS. 6A–6B show the USSN of FIGS. 1A–1B incorporated on another spacecraft support structure (dispenser) in accordance with the present invention.
Figure 6B:
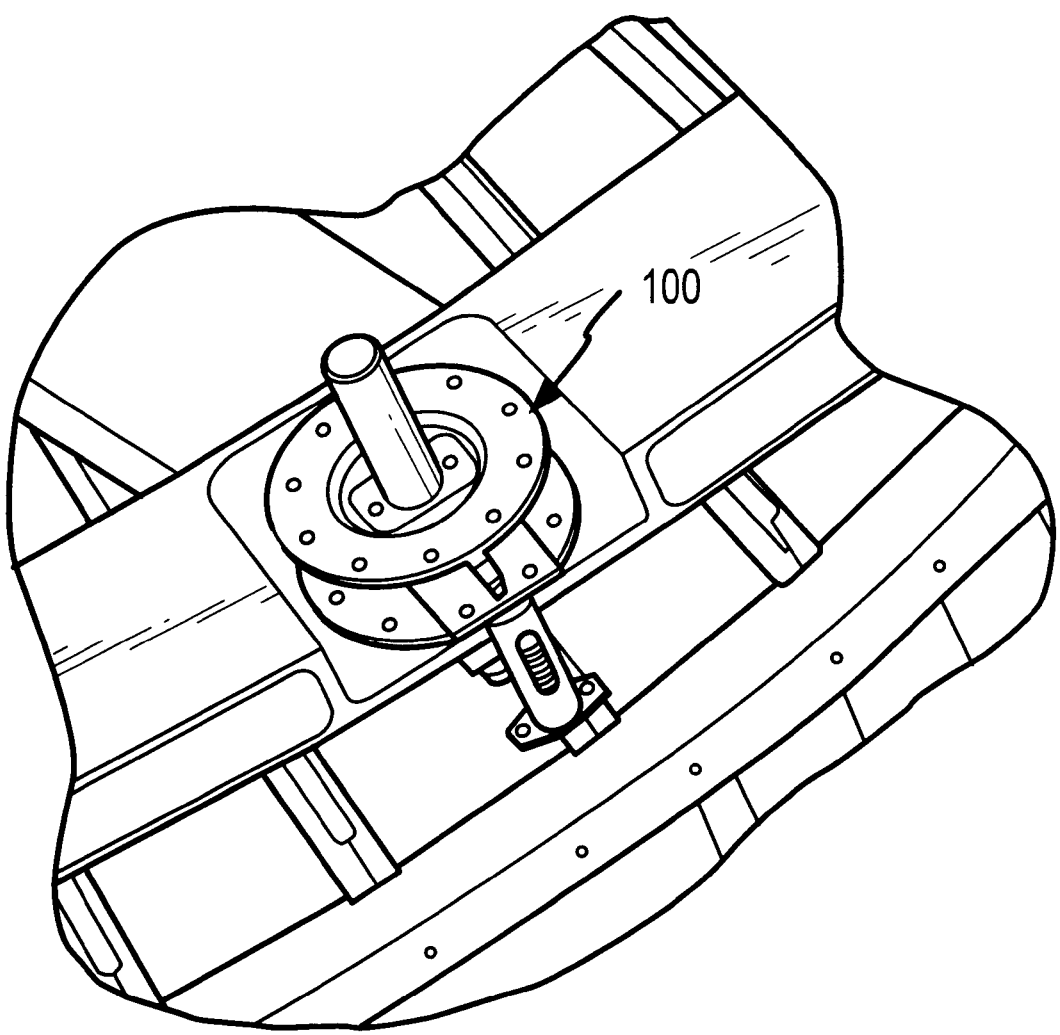

FIGS. 6A and 6B illustrate a second multiple spacecraft support structure (dispenser) 400. In this configuration, four USSN assemblies 100 (FIG. 6B) are used to mount the spacecraft. There are seven spacecraft for a total of 28 USSN assemblies.

The present invention integrates the structural interface and separation system into one or more standardized nodes thereby mitigating risks associated with launch vehicle support structure and spacecraft development, streamlining spacecraft integration efforts, and providing a unique capability with widespread application. The two support structures illustrated in FIGS. 5 and 6 are examples of many applications investigated for use of the USSN 100. These examples set forth above demonstrate the flexibility of the USSN to be used in a variety of configurations.

Testing of the Invention

Figure 7:
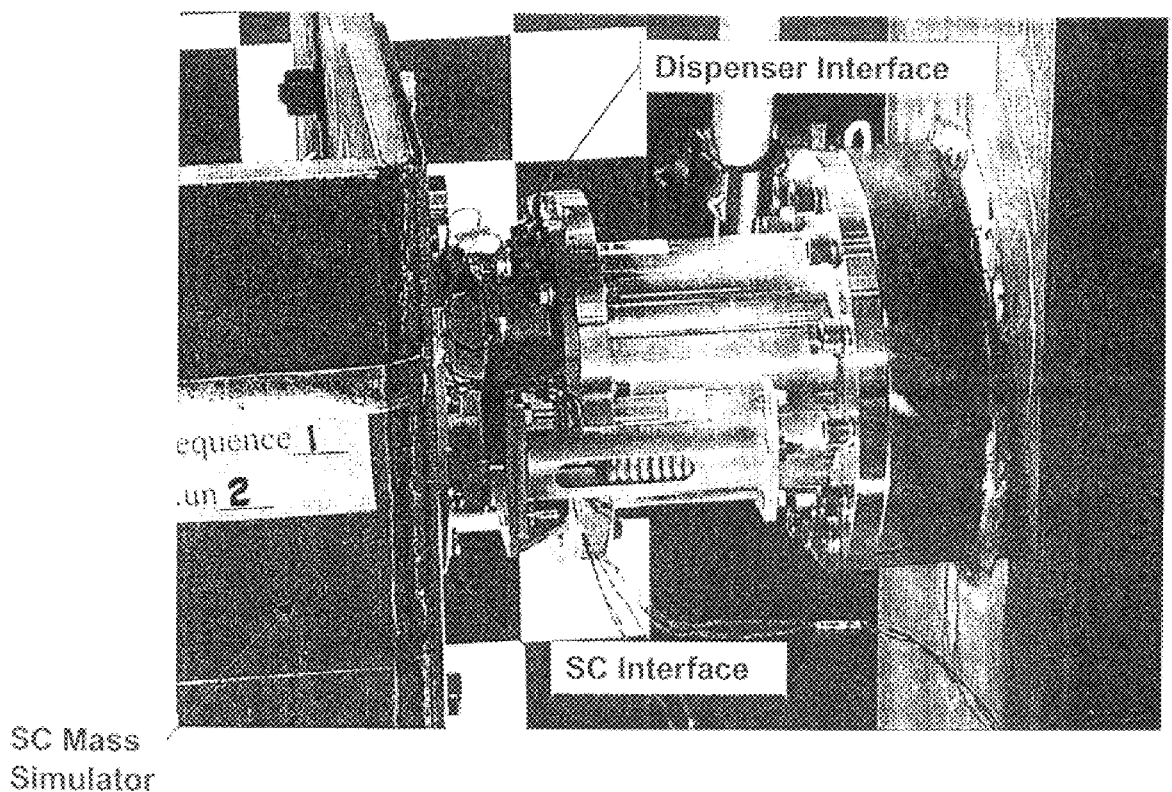
FIG. 7 is a digital photograph of a USSN prototype test program separation test set-up.

To support the design and analysis efforts of the present invention, a prototype test program was performed. Both separation and structural tests were performed to demonstrate functionality and load carrying capabilities. FIG. 7 is a photograph of the separation test hardware.

Twenty one separation tests were performed. These tests were performed with a wide range of separation nut assembly 102 (FIG. 1) pre-loads. Some of the tests induced a tip-off rate to demonstrate that the USSN 100 would still separate under worst case conditions.

Figure 8A:
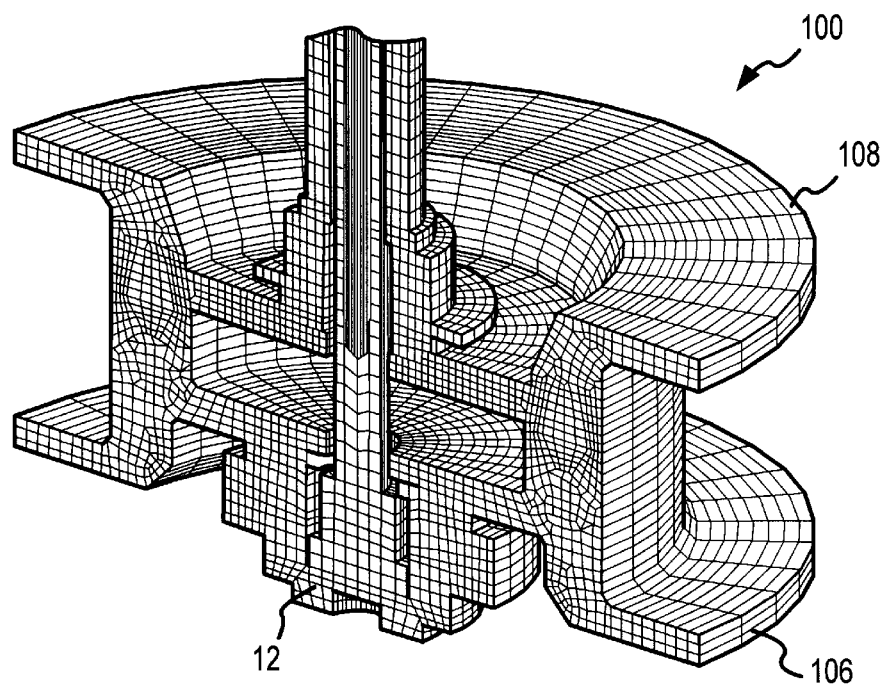
FIGS. 8A–8B are partial perspective and partial side cross-sectional finite element models, respectively, of the USSN of FIGS. 1A–1B.
Figure 8B:
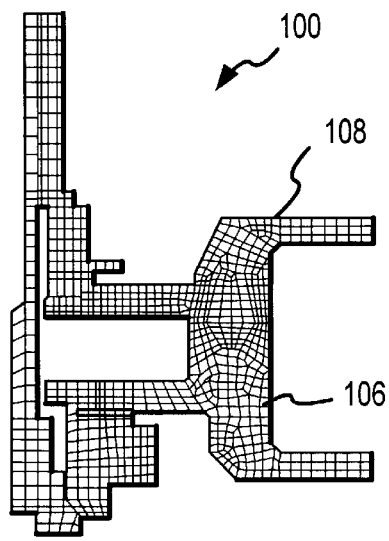
Figure 9:
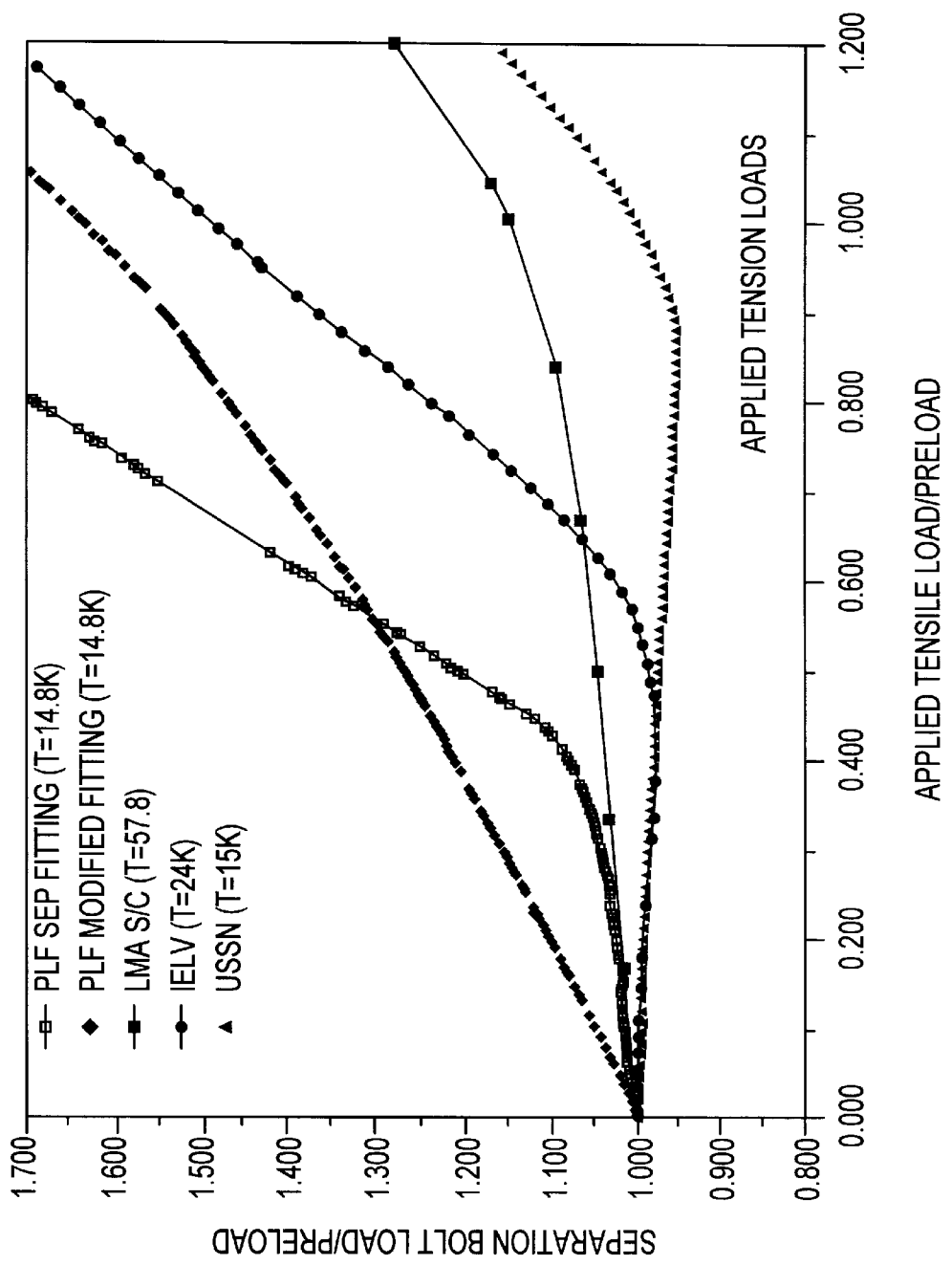
FIG. 9 is a graph showing the USSN structural response to applied tension loads.

Thirteen load cases were performed in the structural tests. Gapping and fatigue testing were included. The objectives of the structural testing were to characterize the USSN 100 structural responses with applied loads and to produce a test-correlated finite element model of the USSN 100 (reference FIGS. 8A–8B: The USSN Finite Element Model, where the reference numerals correspond to FIGS. 1A–1B). The results of the testing indicated that the USSN reacted loads more efficiently than other separation nut interface designs. One very important characteristic of any 'hard-point' or 'node' separation interface is how the separation nut assembly 102 bolt 204 loads are affected by externally applied tension (or combined tension and moment) loads on the node. Pre-loads are set as required for the node to react all predicted load environments. In FIG. 9, the structural response, of the USSN, to applied tension loads is compared to other node interface designs designated PLF Sep Fitting, PLF modified fitting, LMA S/C and IELV. As can be seen in the figure, as tension loads are applied to other designs, bolt 204 loads generally increase prior to the applied tension load being equal to the initial pre-load. Ideally, when the applied tension load is equal to the initial pre-load, there will be no increase in the separation nut assembly bolt 204 load. The figure illustrates that the USSN provides such a response.

While various embodiments and implementations of the present invention have been described in detail, it is apparent that further modifications and adaptations of the invention can occur. However, it is to be expressly understood that such modifications and adaptations are within the spirit and scope of the present invention.

What is claimed is:

1. An apparatus for use in selectively connecting one or more deployable payloads and a dispenser, each said deployable payload including a payload surface and said dispenser including a dispenser surface wherein, prior to deployment of said payload, said payload surface and dispenser surface are disposed in opposing relationship, said payload being deployable from an undeployed state wherein said payload surface and dispenser surface are disposed proximate to one another and a deployed state wherein said payload surface and dispenser surface are separated, said apparatus comprising:

a plurality of node assemblies for cooperatively connecting a single, first payload to said dispenser and for cooperatively allowing deployment of said single, first payload from said dispenser, wherein each node assembly further comprises:

a first section, for interconnection to said dispenser, including a first contact surface; and a second section for interconnection to said payload, including a second contact surface; and said first and second contact surfaces of each said node assembly being disposed in an abutting relationship when said payload is in said undeployed state so as to define an abutting interface and an associated separation plane;

said separation plane being separated from at least one of said payload and dispenser surfaces relative to a transverse axis extending between said payload and dispenser surfaces, wherein said plurality of node assemblies provides a multiple node assembly interface structure between said single, first payload and said dispenser.

2. An apparatus according to claim 1, wherein said separation plane defined by said first and second contact surfaces is disposed between said payload and dispenser surfaces relative to said transverse axis.

3. An apparatus according to claim 1, wherein said separation plane defined by said first and second contact surfaces is substantially flush with one of said payload and dispenser surfaces relative to said transverse axis.

4. An apparatus according to claim 1, further comprising load bearing means, extending across said separation plane, for bearing loads having a component aligned with said separation plane.

5. An apparatus according to claim 4, wherein each said load bearing means comprises a tongue integrally formed on one of said first and second contact surfaces and a mating groove integrally formed on the other of said first and second contact surfaces.

6. An apparatus according to claim 1, further comprising a plurality of pyrotechnic separation bolt assemblies, wherein each assembly includes a first portion interconnected to a said first section and a second portion interconnected to said second section of said node assembly.

7. An apparatus according to claim 6, wherein each said pyrotechnic separation bolt assembly includes an elongate member extending across said abutting interface between said first section and second section of said node assembly.

8. An apparatus according to claim 6, wherein said first section and said second section of each said node assembly define an internal passageway extending across said abutting interface, and said pyrotechnic separation bolt assembly extends within said internal passageway.

9. An apparatus according to claim 1, further comprising biasing means, connected to at least one of said first payload and said dispenser, for urging said first and second contact surfaces apart so as to facilitate deployment.

10. An apparatus according to claim 9, wherein said biasing means is operative for exerting a separation force against one of said first section and second section of at least one node assembly.

11. An apparatus according to claim 9, wherein said biasing means includes a spring.

12. An apparatus for use in selectively connecting one or more deployable payloads and a dispenser, each said deployable payload including a payload surface and said dispenser including a dispenser surface wherein, prior to deployment of said payload, said payload surface and dispenser surface are disposed in opposing relationship, said payload being deployable from an undeployed state wherein said payload surface and dispenser surface are disposed proximate to one another and a deployed state wherein said payload surface and dispenser surface are separated, said apparatus comprising:

a plurality of node assemblies for cooperatively connecting a single, first payload to said dispenser and for cooperatively allowing deployment of said single, first payload from said dispenser, wherein said node assembly further comprise:

a first section, for interconnection to said dispenser, including a fist contact surface; and a second section, for interconnection to said payload, including a second contact surface;

said first and second contact surfaces being disposed in an abutting relationship when said payload is in said undeployed state so as to define an abutting interface and an associated separation plane; and a lateral load bearing element with a first element integrally defined on said first contact surface and a second mating element integrally defined on said second contact surface, wherein said first element is one of a projection and a recess and said second element is one of a mating recess and a mating projection, for bearing loads having a component aligned with said separation plane so as to reduce the likelihood of unintended shearing separation prior to planned deployment.

13. An apparatus as set forth in claim 12, further comprising alignment means for aligning said first section and second section of said node assembly.

14. An apparatus as set forth in claim 13, wherein said alignment means comprises a tapered element having sloped side walls extending from one of said node sections and a mating recess associated with the other of said node sections, wherein said support structure and deployable assembly are aligned as said tapered element is progressively received within said mating recess.

15. An apparatus for use in selectively connecting one or more deployable payloads and a dispenser, each said deployable payload including a payload surface and said dispenser including a dispenser surface wherein, prior to deployment of said payload, said payload surface and dispenser surface are disposed in opposing relationship, said payload being deployable from an undeployed state wherein said payload surface and dispenser surface are disposed proximate to one another and a deployed state wherein said payload surface and dispenser surface are separated, said apparatus comprising:

a plurality of node assemblies for cooperatively connecting a single, first payload to said dispenser and for cooperatively allowing deployment of said single, first payload from said dispenser, wherein each node assembly further comprises:

a first section, for interconnection to said dispenser, including a first contact surface; and a second section for interconnection to said payload, including a second contact surface;

said first and second contact surfaces of each said node assembly being disposed in an abutting relationship when said payload is in said undeployed state so as to define an abutting interface and an associated separation plane; and a pyrotechnic separation bolt assembly for selectively interconnecting said first half and second sections of said node assembly, said pyrotechnic separation bolt assembly including a first portion interconnected to said first section and a second portion interconnected to said second section, said first and second portions being remotely separable so as to effect deployment of said deployable assembly.

16. An apparatus according to claim 15, wherein said separation bolt assembly includes an elongate member extending between said first section and second section of said node assembly across said abutting interface.

17. An apparatus according to claim 15, wherein said first section and second section of said node assembly define an internal passageway extending across said abutting interface, and said pyrotechnic separation bolt assembly extends within said internal passageway.

18. An apparatus for use in selectively connecting one or more deployable payloads and a dispenser, each said deployable payload including a payload surface and said dispenser including a dispenser surface wherein, prior to deployment of said payload, said payload surface and dispenser surface are disposed in opposing relationship, said payload being deployable from an undeployed state wherein said payload surface and dispenser surface are disposed proximate to one another and a deployed state wherein said payload surface and dispenser surface are separated, said apparatus comprising:

a plurality of node assemblies for cooperatively connecting a single, first payload to said dispenser and for cooperatively allowing deployment of said single, first payload from said dispenser, wherein each node assembly further comprises:

a first section, for interconnection to said dispenser, including a first contact surface; and a second section for interconnection to said payload, including a second contact surface;

said first and second contact surfaces of each said node assembly being disposed in an abutting relationship when said payload is in said undeployed state so as to define an abutting interface and an associated separation plane; and at least one biasing means, connected to at least one of said payload and said dispenser, for urging said first and second contact surfaces apart so as to facilitate deployment of said payload.

19. An apparatus according to claim 18, wherein said biasing means is operative for exerting a separation force against one of said first section and second section of said node assembly.

20. An apparatus according to claim 18, wherein said biasing means includes a spring.

21. An apparatus according to claim 18, wherein multiple said biasing means are operative for exerting a concerted separation force against one of said first section and second section of multiple said node assemblies.

22. An apparatus according to claim 18, wherein said multiple biasing means cooperate to control a directional bearing of deployment of said payload relative to said dispenser.

\* \* \* \* \*